United States Patent [19]
Rosenberger et al.

[11] 3,857,626
[45] Dec. 31, 1974

[54] MICROSCOPE COAXIAL ILLUMINATION APPARATUS

[75] Inventors: Harold E. Rosenberger, Brighton; Ralph B. Young, Henrietta, both of N.Y.

[73] Assignee: Bausch & Lomb Incorporated, Rochester, N.Y.

[22] Filed: July 9, 1973

[21] Appl. No.: 377,361

Related U.S. Application Data

[63] Continuation-in-part of Ser. No. 206,033, Dec. 10, 1971, abandoned.

[52] U.S. Cl. .................................. 350/91, 350/236
[51] Int. Cl. .......................................... G02b 21/06
[58] Field of Search ......................... 350/91, 89, 236

[56] References Cited
UNITED STATES PATENTS

| | | | |
|---|---|---|---|
| 2,004,806 | 6/1935 | Ellestad | 350/236 |
| 2,357,378 | 9/1944 | Benford | 350/236 |
| 2,844,992 | 7/1958 | Bernhardt | 350/236 X |
| 2,850,944 | 9/1958 | Engelmann | 350/236 |

FOREIGN PATENTS OR APPLICATIONS

| | | | |
|---|---|---|---|
| 973,489 | 3/1960 | Germany | 350/236 |

*Primary Examiner*—David H. Rubin
*Attorney, Agent, or Firm*—Frank C. Parker; DeWitt M. Morgan

[57] ABSTRACT

Incident dark field illumination apparatus for a microscope. The apparatus includes a reflector, a beam reducer and a dark field condenser. The reflector is designed to be disposed across the optical axis of the microscope at an angle to direct a beam of light, having a cross-section in the shape of an annulus, toward a beam receiving surface provided on the dark field condenser. The outside diameter of this beam receiving surface is smaller than the outside diameter of the beam. The beam reducer is introduced into the annular beam path immediately above the upper surface of the dark field condenser to reduce the diameter of the annular beam to a size compatible with the beam receiving surface of the dark field condenser.

4 Claims, 1 Drawing Figure

PATENTED DEC 31 1974　　　　　　　　　3,857,626
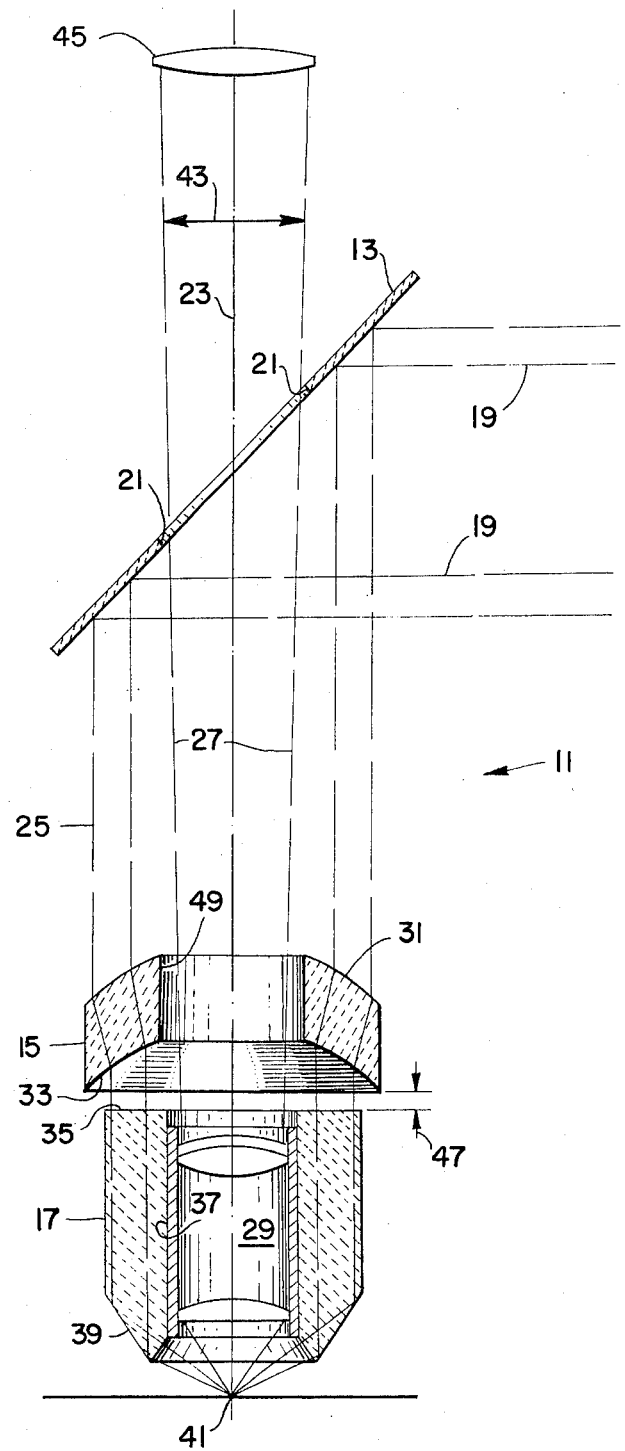

900
MICROSCOPE COAXIAL ILLUMINATION APPARATUS

CROSS-REFERENCE TO RELATED APPLICATION

This application is a continuation-in-part of application Ser. No. 206,033 filed Dec. 10, 1971, now abandoned.

BACKGROUND OF THE INVENTION

The principles involved in incident dark field illumination are well known. In such representative systems as disclosed in U.S. Pat. Nos. 1,935,444 and 2,004,806 an annular parallel beam of light is directed to the specimen plane of a microscope along a path lying entirely outside the path of the image forming beam which emanates from the microscope objective.

In practice, the inside diameter of the annular beam must be substantially larger than the diameter of the image forming beam in the plane of the inclined reflector. Otherwise, stray light arising from the edges of the reflector will reach the microscope's image plane and degrade the image contrast.

In recent years this separation problem has been compounded by the trend toward larger microscope field sizes and correspondingly larger image forming beam diameters.

A solution to this problem, now commonly applied, is to increase the diameter of the dark field condenser. This permits the use of larger annular beam diameters in the plane of the reflector. Such a solution results in satisfactory optical performance, but greatly adds to the cost of dark field objectives and the objective holder (nosepiece). This increased cost comes from having to supply dark field objectives with oversized and, hence, non-standard diameters and correspondingly non-standard nosepieces.

SUMMARY OF THE INVENTION

To obviate the requirement for increased diameter dark field objectives and the required cooperating non-standard nosepieces, a beam reducer of substantially annular configuration is introduced into the path of the illuminating beam immediately above the dark field condenser which surrounds the objective. With this arrangement the large diameter of the illuminating beam, which has substantially the configuration of an annulus in cross-section, is reduced to a size compatible with standard RMS objective mounting diameters. The proximity of the exit surface of the beam reducer to the entrance surface of the dark field condenser prevents scattered light from entering the optical system of the microscope and degrading the image contrast.

BRIEF DESCRIPTION OF THE DRAWING

The FIGURE is a diagrammatical cross-section of the apparatus of the present invention.

DESCRIPTION OF THE PREFERRED EMBODIMENT

Apparatus 11, illustrated in the FIGURE, includes a reflector 13, a beam reducer 15 and a dark field condenser 17. An illuminating collimated beam of light 19 having the cross-section of an annulus is directed toward reflector 13 from a suitable conventional source (not shown). Reflector 13 is provided with an elliptical aperture 21 and is disposed across optical axis 23 of a microscope at an angle to receive annular beam 19 and to direct it, still having the cross-section of an annulus, toward beam reducer 15.

The directed portion 25 of beam 19 has a particularly wide inside diameter so as to provide a wide gap between it and wide-field image-carrying beam 27 which emanates from conventional wide-field objective 29 housed within dark field condenser 17.

Beam reducer 15 is disposed at the lower portion of the microscope tube (not shown) immediately above and adjacent dark field condenser 17. Beam reducer 15 is a generally annular member fashioned from a refracting material such as glass or transparent plastic of good optical quality and chosen for its freedom from bubbles, striae and inhomogeneities which might cause stray light. Upper surface 31 of beam reducer 15 is shaped generally as a conic frustum, sloping downward from the inside outward, so as to receive the rays of portion 25 of annular beam 19, and to refract the said rays inward toward optical axis 23.

Lower surface 33 of beam reducer 15 is also generally conical, sloping upward from the outside inward and is cooperative with upper surface 31 to refract the rays of beam 19 back to a downward direction upon their emergence. These emergent rays are directed as a function of their angle of departure from surface 33, into dark field condenser 17 at its upper surface 35. Surface 35, as viewed in a direction parallel to axis 23, is annular in configuration and, thus, may be described as being confined between two cylindrical surfaces which are substantially concentric about axis 23. In order to maximize the amount of useful light the rays emerging from surface 33 must be incident upon surface 35 at an angle calculated to refract them into a substantially downward path through condenser 17 parallel with sides 37 of objective 29 so as to be incident upon reflecting surface 39 of condenser 17, whence the rays are reflected toward a specimen 41, the latter being optically conjugated to objective 29. In the preferred version, the curvature of the upper and lower surfaces of the beam reducer and its refractive index have been calculated so that the rays emerging from lower surface 33 are vertical and parallel with the rays incident upon upper surface 31. The emergent rays of the preferred version are therefore incident normal to surface 35 which, accordingly lies in a plane substantially perpendicular to optical axis 23.

It is important that upper and lower surfaces 31, 33 of beam reducer 15 and surface 35 of condenser 17 be finished for maximum transmittance and that they be free of irregularities and contaminants which might scatter light into image beam 27 so as to degrade the contrast of the image (visible in the image plane 43 as seen through the eyepiece lens 45). To further prevent degradation of image contrast it is also important that the airspace 47 between beam reducer 15 and surface 35 be as small as possible, preferably in the range of 1.9mm to 3.0mm. Also, central aperture 49 of beam reducer 15 may be opaqued to prevent stray light from escaping into the image channel.

Those skilled in the optical arts will appreciate that beam reducer 15 must be aligned in assembly to direct all or substantially all of its emergent rays upon surface 35 of condenser 17 so as to direct them ultimately to the specimen and to keep them from mischievous random reflections. Thus, in the preferred embodiment, surfaces 31, 33 and 35 are all substantially symmetrical with respect to axis 23.

Surfaces 31 and 33 may depart from the conical to the extent that they may be either spherical or aspherical surfaces of the peripheral portions of a meniscus or meniscoid lens (as in the preferred embodiment), so long as both surfaces of beam reducer 15 and upper surface 35 of condenser 17 are cooperative to produce the necessary downward path of the rays within condenser 17.

It will be appreciated that dark field illumination can be achieved by a substantially complete, but interrupted, annulus of light, and that accordingly the term "annulus" and it derivatives as used throughout this document are intended to include interrupted annuli as well as full rings.

Whereas the drawing and accompanying description have shown and described the preferred embodiment of the present invention, it should be apparent to those skilled in the art that various changes may be made in the form of the invention without affecting the scope thereof.

What we claim is:

1. Incident dark field illumination apparatus for directing a beam of light to the specimen plane of a microscope, said microscope including an objective having an optical axis, said apparatus comprising:
  a. means disposed across said axis for receiving said beam and orientating said beam along a path lying entirely outside the path of the image forming beam which emanates from said objective, said beam as orientated by said orientating means having substantially the cross-section of an annulus, said annulus being centered about said optical axis and having internal and external diameters;
  b. dark field condenser means including a beam receiving surface, said surface confined between external and internal cylindrical surfaces which are substantially concentric with respect to said optical axis, the diameter of said external cylindrical surface being smaller than said external diameter of said orientated beam; and
  c. beam reducer means including first and second refracting surfaces, said beam reducer means interposed between said orientating means and said dark field condenser means with said first and second surfaces substantially centered about said optical axis and with one of said first and second surfaces immediately adjacent said surface of said dark field condenser means, said first and second surfaces cooperating to reduce said internal and external diameters of said orientated beam so that said orientated beam is reduced to a size compatible with said surface of said dark field condenser means.

2. The apparatus as set forth in claim 1 wherein the airspace between said one of said first and second surfaces and said surface of said dark field condenser means is in the range of 1.9mm to 3.0mm.

3. Incident dark field illumination apparatus for a microscope for: first, directing a collimated beam of light having substantially the cross-section of an annulus along a path lying entirely outside the image forming beam that emanates from the objective of said microscope and is substantially concentric about the optical axis of said objective; and second, focusing said beam onto a specimen supported for viewing, said apparatus comprising:
  a. means for receiving said beam and orientting said beam along said path concentric with said optical axis, said orientating means being disposed in a surface which is transverse to said optical axis and which intersects said optical axis at a first location;
  b. beam reducer means centered about said optical axis at a second location along said optical axis, said beam reducer means including first and second refracting surfaces, said first surface intersecting the path of said beam, said first and second surfaces cooperating to refract the rays of said beam toward said optical axis while maintaining said rays in substantially parallel relation with one another to thereby transmit a substantially collimated beam; and
  c. dark field condenser means substantially centered about said optical axis at a third location along said optical axis, said second location being between said first and third locations, said condenser means including a surface substantially symmetrical about said optical axis, said condenser surface intersecting the path of said transmitted collimated beam, said condenser surface being immediately adjacent said second surface of said beam reducer means.

4. The apparatus as set forth in claim 3 wherein said condenser surface is airspaced from said one of said first and second surfaces, said airspace being in the range of 1.9mm to 3.0mm.

* * * * *